(12) United States Patent
Westbrook et al.

(10) Patent No.: US 9,083,147 B2
(45) Date of Patent: Jul. 14, 2015

(54) DISTRIBUTED FEEDBACK (DFB) BRILLOUIN FIBER LASERS

(71) Applicant: OFS Fitel, LLC, Norcross, GA (US)

(72) Inventors: Paul S Westbrook, Bridgewater, NJ (US); Kazi S Abedin, Basking Ridge, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/352,331

(22) PCT Filed: Oct. 29, 2012

(86) PCT No.: PCT/US2012/062446
§ 371 (c)(1),
(2) Date: Apr. 17, 2014

(87) PCT Pub. No.: WO2013/063586
PCT Pub. Date: May 2, 2013

(65) Prior Publication Data
US 2014/0269789 A1   Sep. 18, 2014

Related U.S. Application Data

(60) Provisional application No. 61/552,665, filed on Oct. 28, 2011.

(51) Int. Cl.
*H01S 3/13* (2006.01)
*H01S 3/30* (2006.01)
*H01S 3/067* (2006.01)

(52) U.S. Cl.
CPC ............. *H01S 3/1305* (2013.01); *H01S 3/0675* (2013.01); *H01S 3/302* (2013.01); *H01S 3/06716* (2013.01)

(58) Field of Classification Search
CPC ........... H01S 3/067; H01S 3/302; H01S 3/30; H01S 3/06716; H01S 3/08009; H01S 3/08031
USPC ............................................................ 372/6
See application file for complete search history.

(56) References Cited

U.S. PATENT DOCUMENTS

| 5,561,675 | A | * | 10/1996 | Bayon et al. | 372/6 |
| 5,771,251 | A | * | 6/1998 | Kringlebotn et al. | 372/6 |
| 2002/0191279 | A1 | * | 12/2002 | DeCusatis et al. | 359/341.41 |
| 2005/0281298 | A1 | * | 12/2005 | Kupershmidt et al. | 372/34 |
| 2007/0053400 | A1 | * | 3/2007 | Sinha et al. | 372/64 |
| 2011/0134940 | A1 | * | 6/2011 | Hartog | 372/6 |

* cited by examiner

Primary Examiner — Xinning Niu

(57) ABSTRACT

A Brillouin fiber laser uses a distributed feedback (DFB) fiber Bragg grating with a discrete π-phase shift, which is offset from the physical center of the grating as a resonator. Lasing is achieved by using the SBS gain in the DFB from narrow-linewidth laser pump radiation with an optical frequency that is higher than the central pass band of the grating by an amount nominally equal to the Stokes's frequency shift, $v_B$. The lasing occurs at a wavelength that corresponds to the first Stokes wave. The Brillouin DFB fiber laser has a low threshold, does not require any fiber optic couplers, does not require rare-earth doping, enables connection of many DFB lasers in series, pumping using a multi-wavelength or wavelength tunable laser sources, and the laser output can be delivered along the direction of the pump propagation or in the reverse direction.

11 Claims, 12 Drawing Sheets

DISTRIBUTED FEEDBACK (DFB) BRILLOUIN FIBER LASERS

CROSS-REFERENCES

This application claims the benefit of U.S. Provisional Patent Application Ser. No. 61/552,665, filed on Oct. 28, 2011, having the title "DFB Brillouin Fiber Lasers," the entirety of which is incorporated herein by reference.

Also incorporated by reference are:
- J. Boschung, L. Thevenaz, and P. A. Robert, "High-accuracy measurements of the linewidth of a Brillouin fiber ring laser," Electron. Lett., 30, 1488-1489, (1994);
- L. F. Stokes, M. Chodorow, and H. J. Shaw, "All-fiber stimulated Brillouin ring laser with submilliwatt pump threshold," Opt. Lett. 7, 509-511 (1982);
- S. P. Smith, F. Zarinetchi, and S. Ezekiel, "Narrow-linewidth stimulated Brillouin fiber laser and applications," Opt. Lett. 16, 393-395 (1991);
- M. H. Al-Mansoori, M. Kamil Abd-Rahman, F. R. Mahamd Adikan, and M. A. Mandi, "Widely tunable linear cavity multiwavelength Brillouin-Erbium fiber lasers," Opt. Exp. 13, 3471-3476 (2005);
- A. Loayssa, D. Benito, and M. J. Garde, "Optical carrier-suppression technique with a Brillouin-erbium fiber laser," Opt. Lett. 25, 197-199 (2000);
- S. Norcia, S. Tonda-Goldstein, D. Dolfi, and J.-P. Huignard, "Efficient single-mode Brillouin fiber laser for low-noise optical carrier reduction of microwave signals," Opt. Lett. 28, 1888-1890 (2003);
- J. Geng, S. Staines, and S. Jiang, "Dual-frequency Brillouin fiber laser for optical generation of tunable low-noise radio frequency/microwave frequency," Opt. Lett. 33, pp. 16-18 (2008);
- J. Geng and S. Jiang, "Pump to-Stokes transfer of relative intensity noise in Brillouin fiber ring lasers," Opt. Lett. 32, 11-13 (2007);
- J. Geng, S. Staines, Z. Wang, J. Zong, M. Blake, and S. Jiang, "Actively stabilized Brillouin fiber laser with high output power and low noise," paper OThC4, Optical Fiber Communication Conference (OFC 2006);
- K. S. Abedin, "Single-frequency Brillouin lasing using single-mode $As_2Se_3$ chalcogenide fiber," Opt. Express 14, 4037-4042 (2006);
- J. T. Kringlebotn, J.-L. Archambault, L. Reekie, and D. N. Payne, "$Er^{3+}$:$Yb^{3+}$-codoped fiber distributed-feedback laser," Opt. Lett., 19, 2101-2103 (1994);
- V. C. Lauridsen, J. H. Povlsen, and P. Varming, "Design of DFB fibre lasers," Electron. Lett. 34, 2028-2030 (1998); and
- P. Westbrook, K. S. Abedin, J. W Nicholson, T. Kremp, and J. Porque, "Raman fiber distributed feedback lasers," Opt. Lett. 36, 2895-2897 (2011).
- K. Abedin, P. Westbrook, Jeffrey W. Nicholson, Jerome Porque, Tristan Kremp, and Xiaoping Liu. "Single-frequency Brillouin distributed feedback fiber laser," Opt. Lett. 37, 605-607 (2012).

BACKGROUND

Brillouin fiber lasers operating in single longitudinal mode have been found useful for various applications including microwave signal processing, noise suppression, spectral narrowing, and so on. It has been shown that both acoustic damping and cavity feedback are responsible for phase noise reduction of the pump laser, thereby yielding much narrower spectral linewidth in single-frequency Brillouin fiber lasers. The spectral linewidth of a free running single frequency fiber ring laser can be only a few hertz (Hz), which is several orders of magnitude narrower than the pump beam.

So far, Brillouin fiber lasers have been constructed in the form of Fabry-Perot or ring resonators. However, such designs require hundreds of meters long fiber to obtain gain enough to overcome the loss and to reach the threshold. Because of such long lengths, existing Brillouin lasers tend to oscillate with multiple longitudinal modes, which degrade the performance of the laser for above mentioned applications by introducing additional noise.

Short cavity (about 20 meters (m)) Brillouin lasers that are doubly resonant to both pump and Stokes have been also been realized for single-mode operation with low pump power. However, they require active feedback control, which makes them difficult to operate. Another drawback of a conventional Brillouin fiber laser is that the first-order Stokes wave is subsequently converted to higher order Stokes waves, which affects the overall efficiency or performance.

SUMMARY

Embodiments of the present invention depict a fiber laser, comprising a distributed feedback cavity having a resonance frequency ($v_o$) a, and a pump source optically coupled to one end of the cavity, where the pump source is used to launch pump radiation having a peak frequency ($v_p$), where the pump radiation produces a stimulated Brillouin gain characterized by a Stokes frequency shift ($v_B$) inside the cavity and the stimulated Brillouin gain produces lasing at a Stokes wavelength.

DETAILED DESCRIPTION

Stimulated Brillouin scattering (SBS) takes place when laser radiation propagates through an optical fiber. SBS is useful for various applications such as narrowband amplification, lasing, distributed sensing, phase conjugation, slow light generation, and so on. Light that is scattered in a backward direction (known as the Stokes wave) experiences a frequency downshift by an amount equal to $v_B = 2nv_A/\lambda_p$, where $v_A$ is the acoustic velocity, n is the refractive index of the optical fiber, and $\lambda_p$ is the pump wavelength.

SBS can also be used to amplify a counter-propagating signal with a wavelength near the Stokes wave. Taking advantage of Brillouin gain, fiber lasers (in resonant structures such as ring and Fabry-Perot configurations) can be made, which generate both single and multiple order Stokes waves.

SBS fiber lasers operating in single longitudinal mode are particularly attractive for optical microwave signal processing.

Despite the narrow SBS gain bandwidth (for example, a few tens of megahertz (MHz) in silica fibers) it is difficult to realize single frequency operation. Fiber lengths of hundreds of meters are typically required to allow for sufficient gain to reach threshold, causing the cavity to operate with multiple longitudinal modes. Short cavity SBS lasers with active feedback stabilization are used to make the cavity doubly-resonant to both pump and Stokes, allowing low threshold. Also, single frequency SBS lasers exist, using only a few meters of chalcogenide glass fiber, which has a Brillouin gain coefficient about two orders of magnitude higher than that of silica fibers. However, a chalcogenide glass fiber has a number of drawbacks, which include low damage threshold, difficulty in handling and splicing to silica fiber, and large transmission loss.

In one embodiment, a solution is provided herein to address the above identified problems by using distributed feedback (DFB) fiber Bragg gratings with a discrete π-phase shift as a resonator and by applying a narrow linewidth laser radiation with appropriate wavelength, which is launched into the DFB as a pump wave. The pump is tuned so that its optical frequency is higher than the resonant transmission frequency of the grating by Stokes frequency shift $v_B$ in the fiber.

Figure 1:
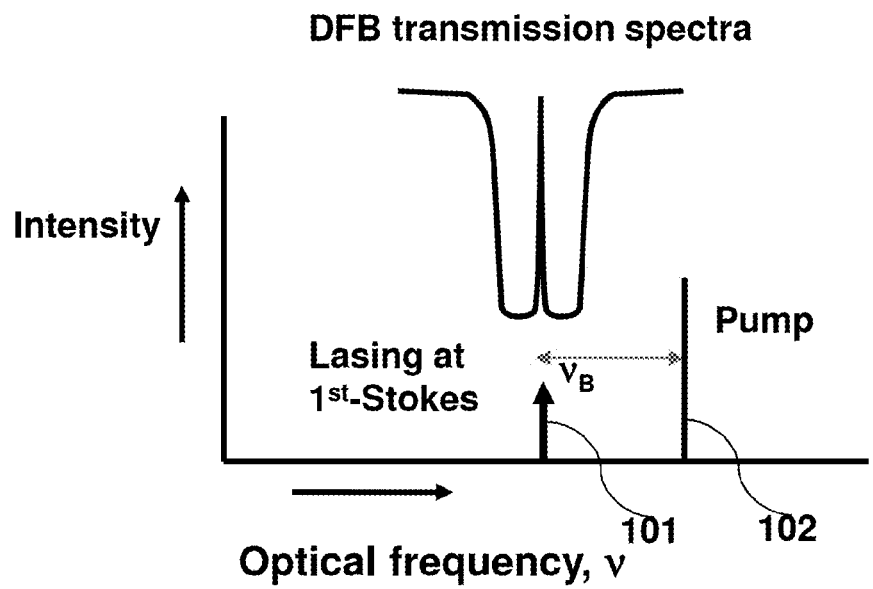
FIG. 1 illustrates a transmission spectrum of a distributed feedback (DFB) Brillouin fiber laser.

FIG. 1 shows a diagram of a spectrum of the optical signal (pump) and the DFB fiber Bragg grating. In such arrangement, as illustrated in a spectral graph in FIG. 1, the pump spectral component 102 is located outside of the grating's reflection band, and can thus transmit through the grating and provide Brillouin gain within the grating structure, which causes the cavity to lase at the Stokes wavelength, of which the spectral component is illustrated in FIG. 1 as 101. The DFB gratings have a high Q-factor that enables low lasing threshold, and narrow bandwidth that ensures operation in single longitudinal mode.

The DFB laser operating with a single longitudinal mode, has a threshold as low as 30 milliwatts (mW), and conversion efficiency from pump to Stokes wave as high as 27%, while higher-order Stokes waves are suppressed by more than 20 decibels (dB).

In one embodiment, the laser is configured to obtain the Stokes wave in either forward or backward direction. This is achieved by changing the orientation of the offset of the discrete phase shift with respect to the pump propagation direction. The laser operates in a very broad range of pump frequency (e.g., over 1.2 gigahertz (GHz)), which is approximately 50 to 60 times larger than the SBS gain bandwidth.

Laser Setup

Figure 2:
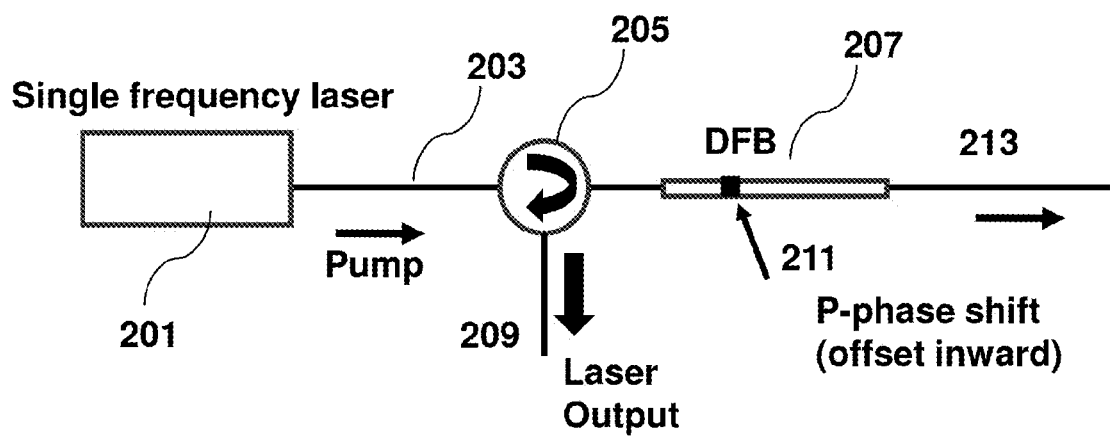
FIGS. 2-3 illustrate distributed feedback (DFB) Brillouin fiber lasers.
Figure 3:
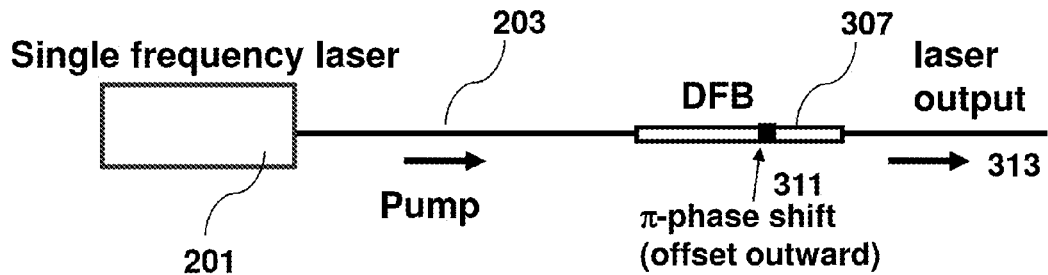

Setups of the DFB Brillouin fiber laser are shown in FIGS. 2 and 3. In one embodiment, FIG. 2 illustrates a set-up that outputs the Stokes wave in a reverse direction of a pump signal. This set-up has a pump laser 201 optically coupled to a fiber 203, which has a DFB grating 207 with a P-phase (or π-phase) shift 211 that is offset inward to the input of the DFB. The Stokes wave is outputted through a circulator 205 on output 209. The remaining pump signal continues through fiber part 213.

FIG. 3 illustrates a set-up with scattering of the Stokes wave in a forward direction of the pump signal. This set-up has a pump laser 201 optically coupled to a fiber 203, which has a DFB grating 307 with a P-phase (or π-phase) shift 311 that is offset outward relative to the input of the DFB. The Stokes wave is outputted through fiber output 313 together with the remaining pump signal.

The DFB fiber Bragg grating (FBG), in one embodiment, has an offset π-phase shifted with a center wavelength of approximately 1583.4 nanometers (nm) written in highly nonlinear fiber using direct UV inscription. The grating is approximately 12.4 centimeters (cm) long and has a distributed coupling coefficient of approximately 90 m$^{-1}$, and the π-phase shift is located at approximately 8%-offset from the center. In rare-earth-doped DFB systems, a few percent offset in the location of the discrete phase shift can be effective in delivering the output in one direction.

In one embodiment, as illustrated in FIG. 3, a grating is employed with a similar amount of offset in phase-shift and lasing in the forward direction, although the signal amplification due to SBS generally takes place for signals propagating only in the backward direction.

Figure 4:
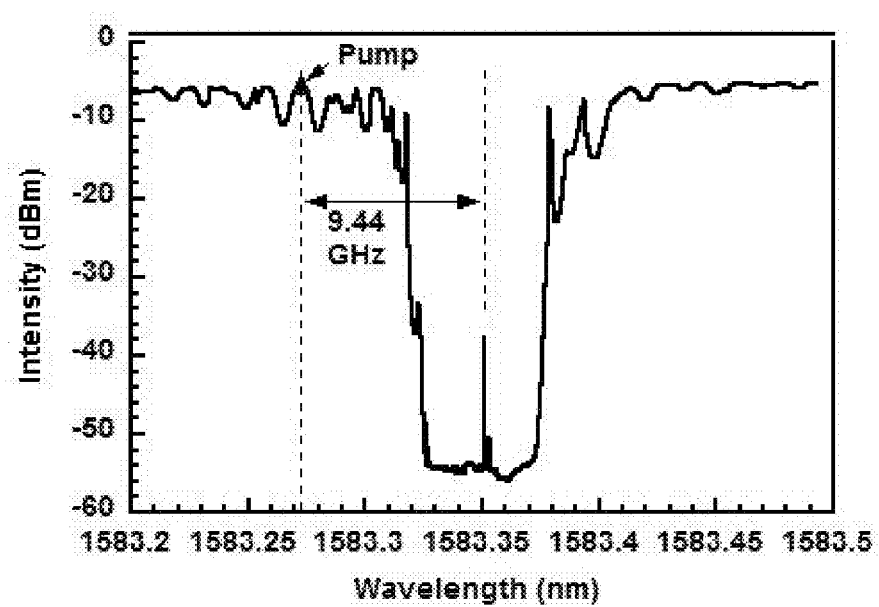
FIG. 4 illustrates a transmission spectrum of a Bragg grating.

In one embodiment, light from a continuous wave (cw) external cavity semiconductor laser operating near 1583 nm, with a typical linewidth of approximately 150 kilohertz (kHz), is amplified by an L-band amplifier to a maximum of 143 mW and launched into the DFB grating through a circulator. The wavelength of the pump in relation to the grating transmission spectrum is shown in FIG. 4. The location of the pump and lasing frequencies are indicated by vertical lines.

The reflection spectrum of the grating has a half-width of about 3.7 GHz (30 pm). The pump is tuned so that its optical frequency is higher than the resonant transmission frequency of the grating by about 9.4 GHz, which is equivalent to the Stokes shift in the nonlinear fiber used herein. In such an arrangement, the pump is located outside of the grating's reflection band, and can thus transmit through the grating and provide Brillouin gain. This π-phase shift grating has a pair of resonant transmission peaks (not apparent in FIG. 4) separated by approximately 220 MHz due to birefringence of the fiber.

Ripples present in the edges of the transmission spectrum of FIG. 4 are due to the grating not being apodized. Apodizing the grating can make the transmission edge much smoother and flatter, which is useful for efficient pumping of the laser.

An optical spectrum analyzer and a power meter can be used to record outputs from the DFB fiber structure with the discrete phase shift facing inward (toward the pump source) as well as outward (away from the pump source). The beating between the Stokes signal and a small part of back-reflected pump can be measured using a high speed photodiode and an electrical spectrum analyzer.

Stable lasing at the Stokes wavelength are achievable by tuning the optical frequency of the pump to overlap the SBS gain spectrum with the narrowband resonance of the grating.

Figure 5:
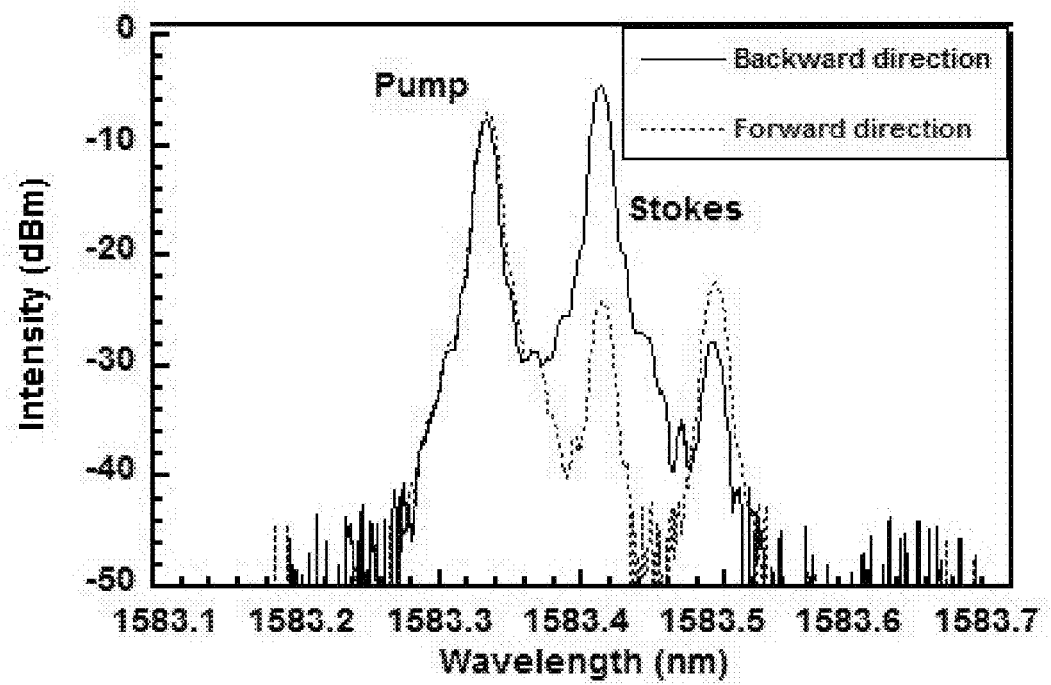
FIG. 5 illustrates optical spectra in forward and backward direction from DFB Brillouin fiber lasers.

FIG. 5 shows the optical spectra of the output in the backward and forward directions when the phase shift offset was pointing towards the pump (facing inwards). The Stokes wavelength (red-shifted by 80 pm (picometer) from pump) achieves lasing with a peak power that is larger than the residual pump power. With the phase shift facing backward, the backward Stokes output is about 20 dB higher than that in the forward Stokes output. Moreover, since the second order Stokes wavelength is out of resonance, subsequent conversion to higher order stokes waves is greatly suppressed.

The second-order Stokes wave emitting in either direction is lower by more than 20 dB compared with the first-order Stokes wave. The beat frequency of the pump and Stokes wave is observed in the electrical spectrum of the output in the backward direction.

Figure 6:
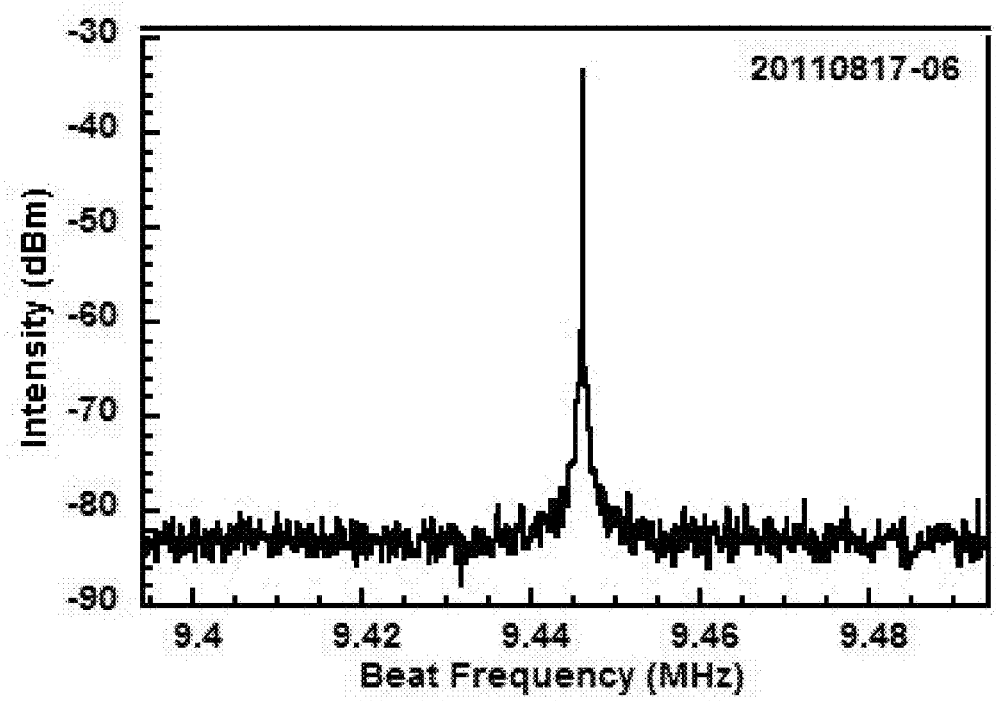
FIG. 6 illustrates a beat spectrum of a pump and a Stokes signal from a DFB Brillouin fiber laser.

The electrical spectrum of the beat signal derived from pump and generated signal of the set-up related to FIG. 5 is provided in FIG. 6 and clearly demonstrates narrow, single frequency Stokes generation. The peak in FIG. 6 observed at approximately 9.44 GHz is in agreement with the Stokes shift measurements from spontaneous Brillouin scattering in this fiber for a pump at approximately 1583 nm.

Figure 7:
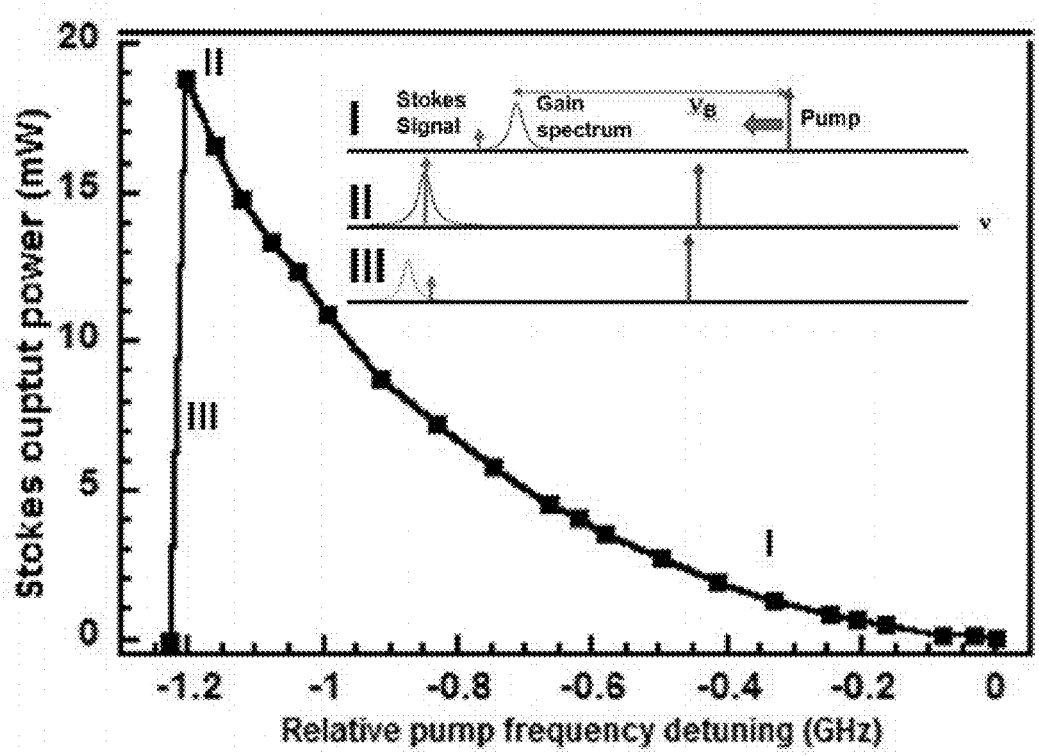
FIG. 7 illustrates a DFB Brillouin fiber laser output as a function of pump laser detuning.

The particular Brillouin DFB laser configuration, as described above, has the advantage of allowing for oscillation in a broad range of pump frequencies. FIG. 7 plots the intensity of the Stokes wave as a function of frequency detuning, when the pump power is held constant. The range of pump tuning over which lasing is sustained is 1.2 GHz, which is about 60 times larger than the Brillouin gain bandwidth. The reason for this behavior is explainable using the inset of FIG. 7, which is shown enlarged in FIG. 8. As the overlap of the Brillouin gain with the narrow resonance increases, the Stokes signal strengthens, which effectively causes an increase in the refractive index due to Kerr induced nonlinearity as well as non-uniform heating caused by the intracavity signal. The lasing frequency thus continues to decrease as the pump frequency further decreases, until the peaks of both SBS gain and the lasing wavelength coincide. At this pump frequency, the output power is maximized.

Beyond that, if the frequency decreases further by a small amount, the lasing field experiences smaller gain and a reduced Kerr effect, so its frequency (or the cavity resonance) increases. Since the directions of shift of the lasing frequency is opposite to that of the pump detuning, the Stokes field no longer tracks the pump (as illustrated in the region III), which results in abrupt termination of lasing. The extinction of the laser is expected to occur in a frequency detuning range, which is about half of the Brillouin line width.

Figure 9:
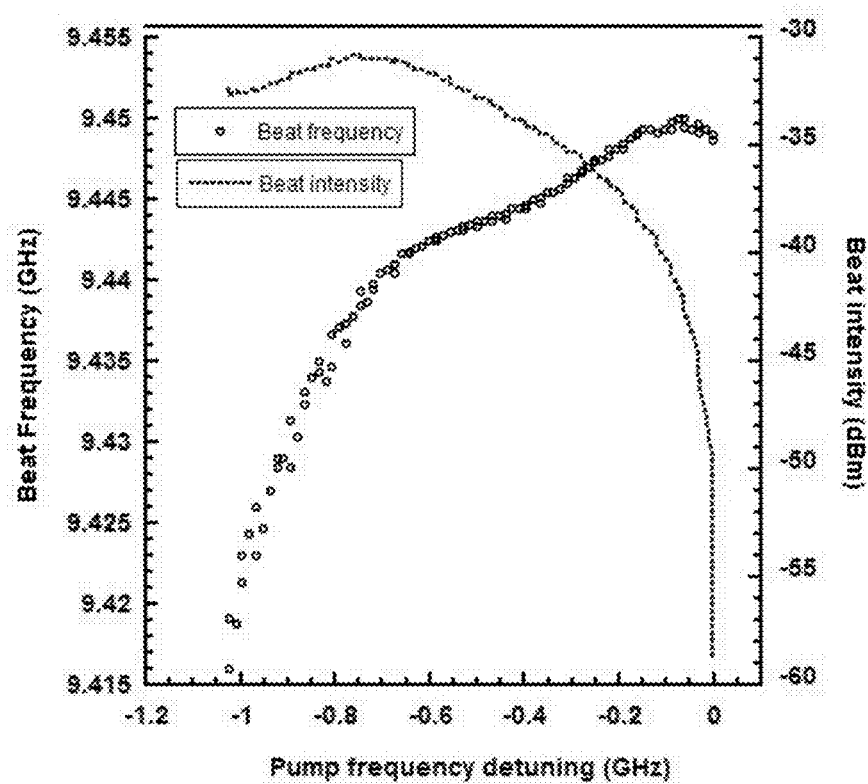
FIG. 9 illustrates frequency and intensity of beat note between a Stokes and pump signal as result of pump frequency detuning.

The Brillouin DFB laser can be turned on by tuning the pump frequency from a high to a low frequency around the grating resonance; in contrast the laser does not turn on when the pump frequency changes from a low to high frequency. Furthermore, as the pump is detuned by as much as 1.2 GHz, the beat frequency between pump and Stokes wave changes by approximately 35 MHz, since the Stokes frequency is being pulled along by the pump frequency. This is illustrated in FIG. 9, which shows frequency and intensity of a beat note between Stokes and pump signal that is plotted as a function of pump frequency detuning. The reference is arbitrarily chosen as the pump frequency when it starts to lase.

The effects as described above and illustrated in FIGS. 7 through 9 stand in stark contrast with the Brillouin fiber ring lasers reported earlier, which rely on active stabilization because of small tolerances (e.g., only several tens of MHz) against pump frequency fluctuations.

Figure 10:
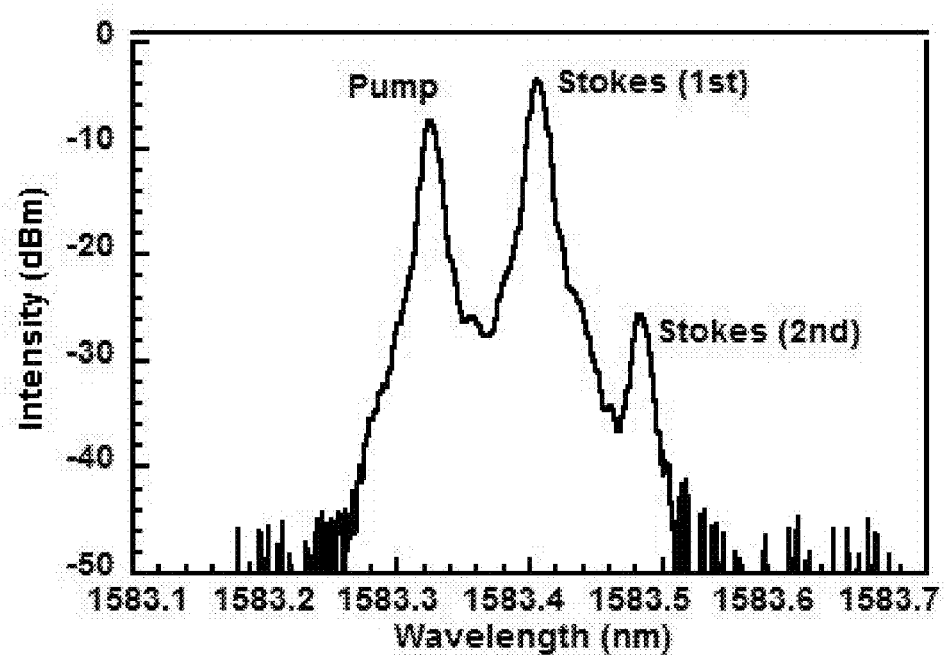
FIG. 10 illustrates an optical spectrum of an output signal in a forward direction of a DFB Brillouin fiber laser.

The optical spectrum of the output obtained in the forward direction from the laser with the discrete phase shift facing outward is shown in FIG. 10. The Stokes wave with intensity that is stronger than the residual pump is generated in the forward direction when the pump wavelength is tuned optimally, indicating significant pump-to-Stokes conversion. The Stokes output in the backward direction, not shown in FIG. 10, is about 20 dB lower than obtained in the forward direction.

Figure 11:
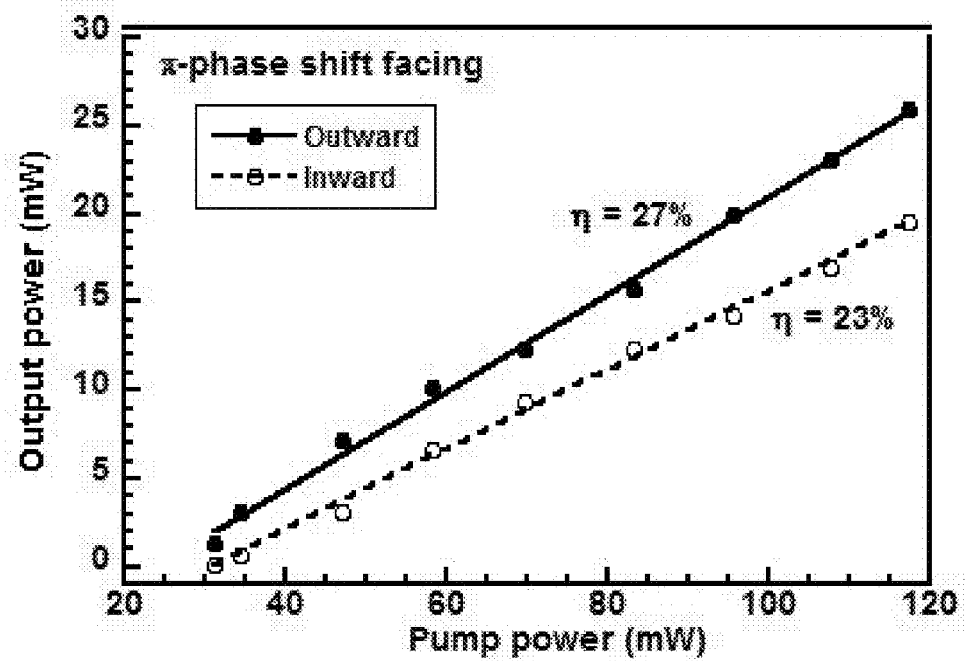
FIG. 11 illustrates power of an output Stokes signal as a function of the pump power of DFB Brillouin fiber lasers.

The output power of the Brillouin lasers provided herein are measured as a function of pump power for both configurations, namely, with the offset phase shift facing outward (towards the pump propagation) and inward (opposite to pump propagation direction). FIG. 11 shows the output (Stokes) power plotted as a function of launched pump power. For each pump power, the maximum output power is measured by an optimization of the pump frequency. A similar lasing threshold of about 25 mW is obtained, but with slightly different slope efficiency of about 23% and 27% for π-phase shift facing inward and outward directions, respectively. Further improvement in efficiency and lower threshold is expected through optimization of the grating design, which includes apodizing the grating to minimize the reflection of the pump wave and suppressing the intrinsic loss of the fiber While rare earth DFB fiber lasers have the tendency to oscillate with two polarization modes, a DFB Brillouin fiber laser can oscillate in only one polarization state. The birefringence in the DFB-grating-caused polarization splitting is about 200 MHz (much larger than the Brillouin gain linewidth), thus making it possible to restrict lasing in only one polarization state.

Although single frequency narrowband laser radiation is used (e.g., the pump in the above DFB Brillouin fiber lasers), it is not a strict requirement. It is well known that a Brillouin fiber laser is capable of producing narrow-band (on the order of kHz linewidth) laser output, by using a pump with linewidth comparable to the Brillouin linewidth, $\Delta v_B$ (on the order of several MHz). Therefore, one should be able to use a broadband or multi-longitudinal mode pump source having a spectral width less than $\Delta v_B$. In the above demonstration, an external cavity semiconductor laser functions as the pump source. One can also use other output from other types of lasers, such as fiber lasers or semiconductor or solid state lasers. The output of such pump sources can be amplified using a suitable amplifier, before being applied into the distributed feedback laser to obtain a stronger Stokes output.

Figure 12:
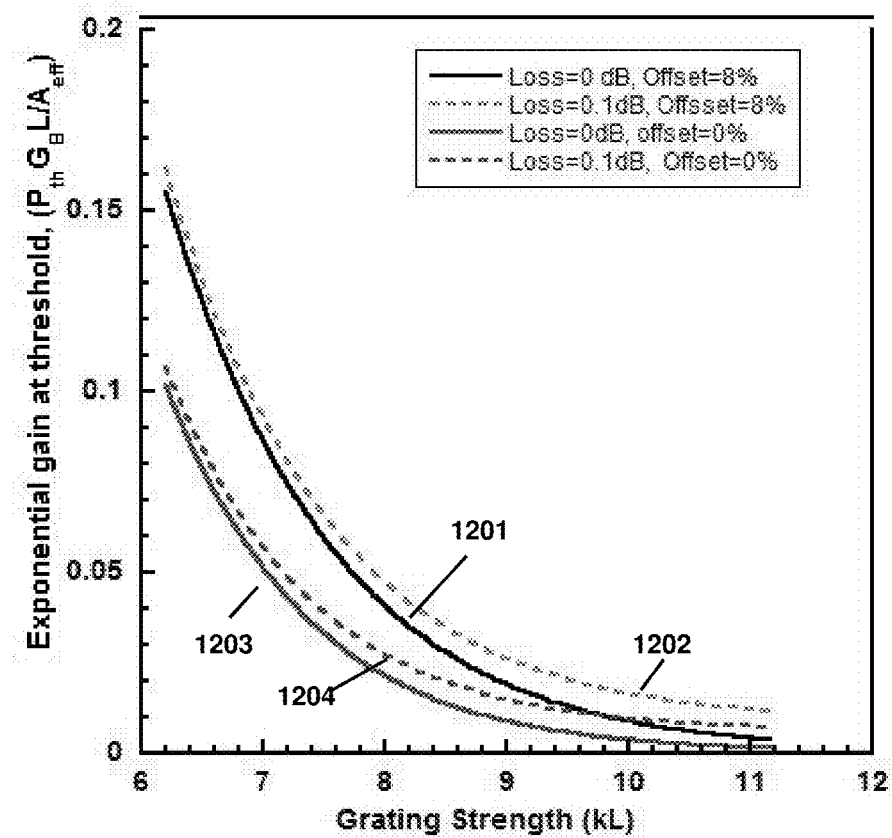
FIG. 12 illustrates a calculated exponential gain as a function of grating strength with parameters for a DFB Brillouin fiber laser.

The threshold of the laser output depends strongly on the device parameters, that includes the grating strength κL, the intrinsic loss αL of the fiber (which also depends on the UV exposure), and the degree of offset in the discrete phase shift. FIG. 12 shows various curves representing numerically-calculated exponential gains for various grating strengths with different cavity losses αL and percentages of phase offset. Curves 1201 (loss of 0 dB at an offset of 8%), 1202 (loss of 0.1 dB at an offset of 8%), 1203 (loss of 0 dB at an offset of 0%), and 1204 (loss of 0.1 dB at an offset of 0%) show that the Brillouin lasing can be achieved over a wide range of grating strengths, intrinsic losses, and different amounts of phase offsets. Lasing threshold is achieved when the gain is large enough to overcome the fiber loss and the effective loss in the resonator due to its finite Q-factor.

In another embodiment, rather than using a DFB fiber Bragg grating in silica fiber, one can also use a non-silica glass fiber that has higher Brillouin gain coefficients, such as, for example, chalcogenide and tellurite glass fibers. In some embodiments, distributed feedback waveguide devices made from suitable optically-transparent material are used to achieve Brillouin lasing.

The following parameters represent one example setup:

κ=90/m
L=0.124 m
$g_B$=5*10$^{-11}$ m/W
$A_{eff}$=16*10$^{-12}$ m$^2$.

With this setup, the threshold power is approximately 28 mW, for an assumed intrinsic loss of 0.1 dB.

Figure 13:
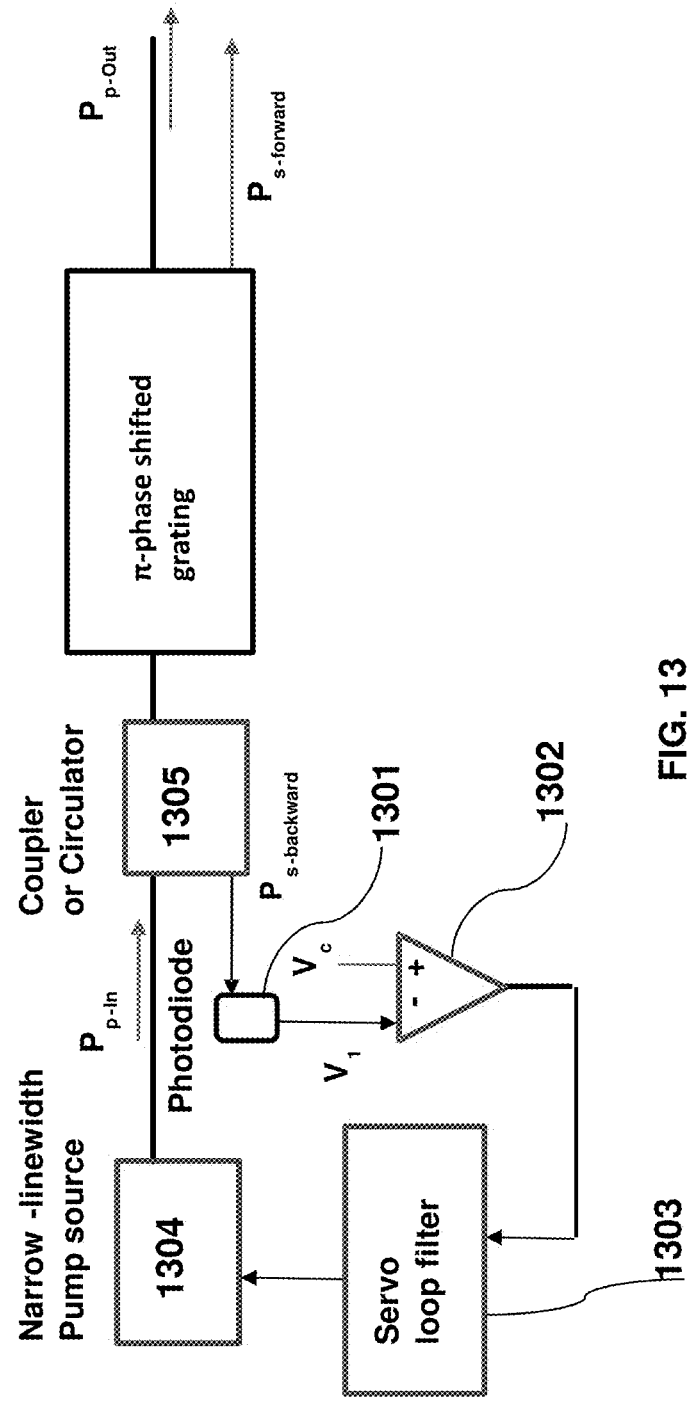
FIGS. 13 and 14 illustrate DFB Brillouin fiber lasers with a feedback control loops.
Figure 14:
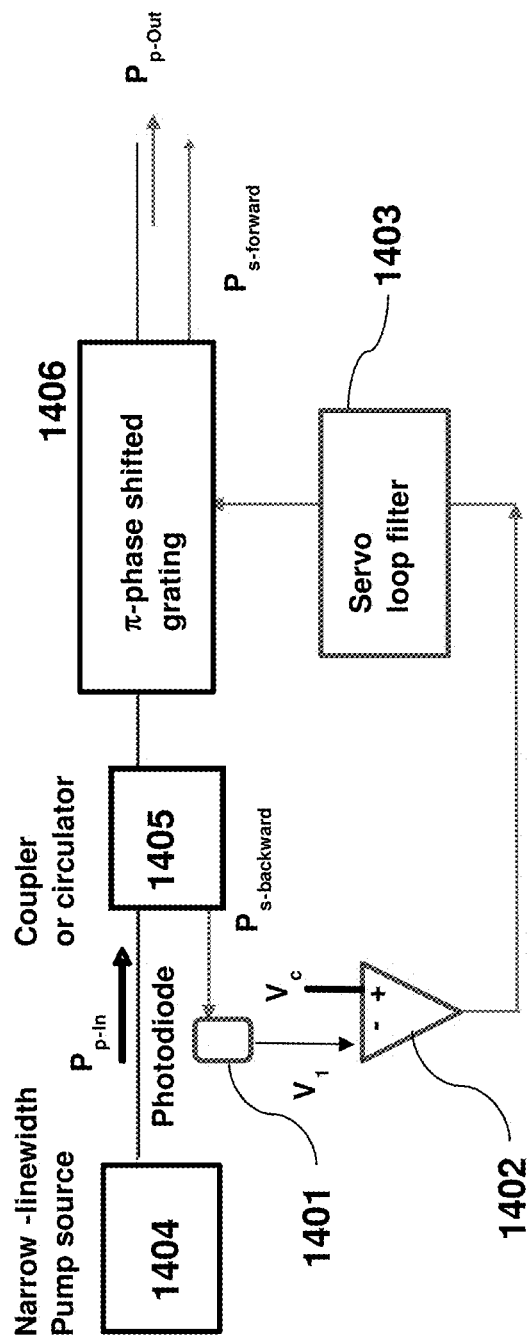

The output power of the DFB Brillouin fiber lasers as provided herein depends on the pump detuning. In order to operate the laser under a stable condition over a period of time, feedback controls as shown in FIGS. 13 and 14 are provided. As shown in FIG. 13, a part of the lasing signal is fed from back-propagated light through a coupler or circulator 1305 into a photodiode 1301 where it is detected and converted into an electrical signal. The output voltage of the photodiode 1301 is compared in a comparator 1302 with a reference voltage to obtain an error signal. In the embodiment of FIG. 13, the error signal is used to control the pump wavelength of the pump laser 1304 through a suitable servo loop 1303. This ensures stable output, which can be varied by adjusting the reference voltage, $V_c$.

Since the pump signal depletes as the Stokes output power increases, one can also use the residual pump signal instead of the signal to derive an error signal. To extract a signal in the backward direction one can use a circulator, a narrow band wavelength-division multiplexed (WDM) filter, or both.

FIG. 14 shows a different embodiment of a feedback control loop, with a circulator or coupler 1405, a photodiode 1401, a comparator 1402, a servo-loop 1403, a pump laser 1404, and a π-phase grating 1406. In the embodiment of FIG. 14, the signal from the servo-loop 1403 controls a parameter of the grating 1406. The error signal herein is used to control the frequency of a central peak transmission of the spectrum, for instance, through temperature or strain adjustments of the DFB fiber.

Figure 15:
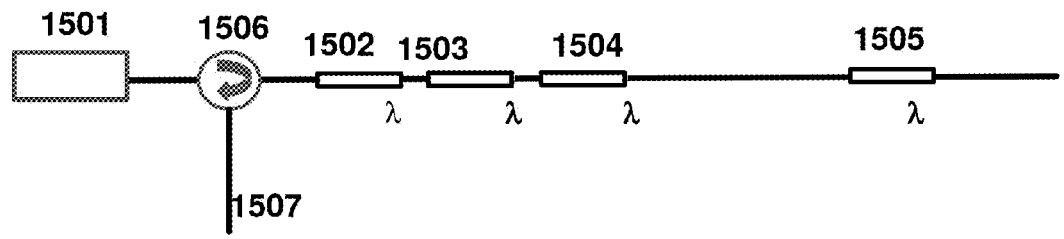
FIG. 15 illustrates operation of multiple DFB Brillouin fiber lasers.

The DFB fiber laser, in one embodiment, may not be doped with rare-earth elements, and thus is non-absorbing, which makes it possible to connect many DFB lasers in series, and to allow pumping using a multi-wavelength or wavelength tunable laser sources. FIG. 15 illustrates an embodiment showing the operation of multiple Brillouin DFB lasers 1502, 1503, 1504 and 1505 (with different resonant wavelengths) using a multi-wavelength or broadband source or a wavelength tunable laser 1501. When a wavelength tunable laser is used as a pump source, DFB lasers will lase in a wavelength-ascending manner over time. In one embodiment, a circulator or coupler is used to output the Brillouin signal on output 1507.

Aspects of the operation of the Brillouin DFB fiber laser provided herein include:
1. Lasing with low a threshold (for example, approximately 30 mW) and narrow signal linewidth.
2. High conversion efficiency (greater than approximately 30%) from the pump to the Stokes wave and suppressing the generation of higher order Stokes waves (because the higher order Stokes wavelength is not in resonance with the grating).
3. The Stokes wave can be obtained preferentially in the forward or backward direction by introducing a small offset (a few percent of the grating length) of the discrete phase shift with respect to the physical center of the grating. When the discrete phase shift offset faces the direction of pump propagation, the DFB laser output can be obtained predominantly in the forward direction. And when the orientation of phase shift offset is reversed (i.e., facing backward with respect to pump propagation), the laser predominantly outputs in the backward direction. In both rare earth and Raman DFB lasers, intra-cavity signal in the DFB cavity is amplified in both directions (forward and backward). In contrast, in a Brillouin DFB laser, as shown herein, Stokes light is amplified only in the backward direction (direction opposite to the pump). Numerical analysis of a Brillouin distributed feedback laser shows a stable solution with continuous wave output, similar to those observed experimentally.
4. The laser can be operated for a wider range of pump detuning (at least 50 times larger than the Brillouin gain linewidth).

EXAMPLE OF APPLICATIONS OF DFB BRILLOUIN LASER (A) Noise Suppression

A Brillouin DFB fiber laser can be used for signal processing and noise suppression, as demonstrated using ring type resonators. It has been reported that when a broadband pump (bandwidth of few MHz) is used to pump a ring-type Brillouin fiber laser, the resulting Stokes wave can have a much narrower linewidth. A Brillouin DFB fiber laser can be used for such bandwidth narrowing application and in similar applications.

Figure 16:
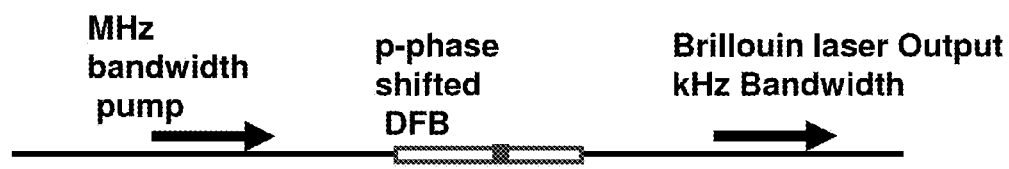
FIGS. 16-18 illustrate DFB Brillouin fiber lasers.
Figure 17:
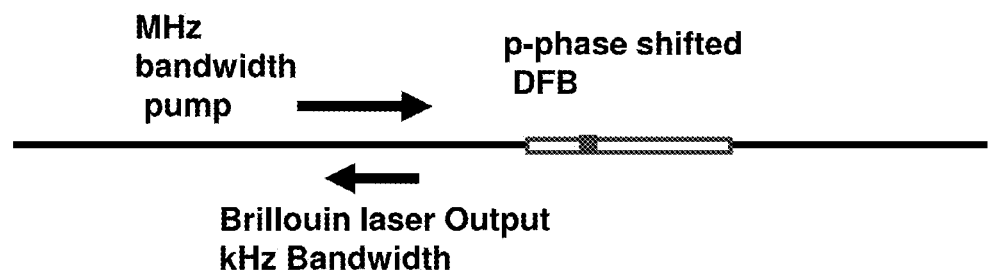

One embodiment for spectral narrowing is shown in FIGS. 16 and 17. FIG. 16 illustrates the laser with an outward facing π-phase shift and FIG. 17 illustrates the laser with an inward facing π-phase shift. The Stokes wave with a line width that is narrower than that of a pump wave can be obtained by lasing the DFB using Brillouin gain as explained earlier. The bandwidths for the pump and signal are given as MHz (pump) and kHz (signal) as examples of preferred embodiments.

The pump wavelength can be provided by a Raman fiber DFB, thus allowing for an all fiber narrow linewidth source.

An even more compact narrow linewidth source can be achieved when the Raman and SBS DFB cavities overlap. In such an arrangement the Raman DFB is made to lase at the optimal wavelength shift from the SBS cavity resonance. Since the gratings partially or completely overlap, the relative shifts are very stable. For instance, even if the fiber temperature changes, the difference in the wavelengths will stay substantially the same, thus maintaining the SBS lasing and resulting in a narrow output linewidth. This eliminates the need for a frequency stabilization scheme for the pump. The Raman DFB is much less sensitive to its pump wavelength since the Raman gain spectrum is very broad (approximately in the terahertz (THz) range).

(B) Optical Microwave Signal Processing

Another application of the Brillouin DFB fiber laser is related to processing weakly intensity-modulated optical signals. In order to avoid saturation of the photo-detector, while detecting the intensity of the optical signal is kept low, which then degrades the signal to noise ratio. It is thus useful to suppress the optical carrier first before it is detected.

Figure 18:
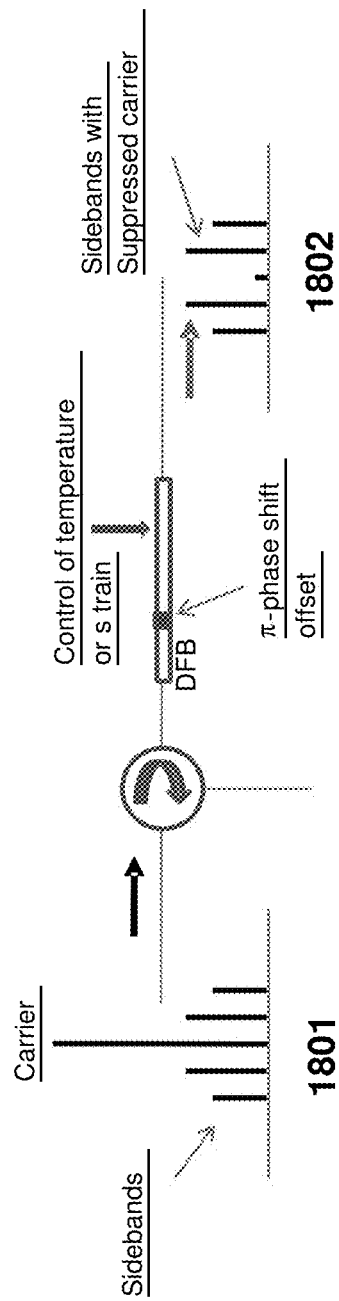
Figure 19:
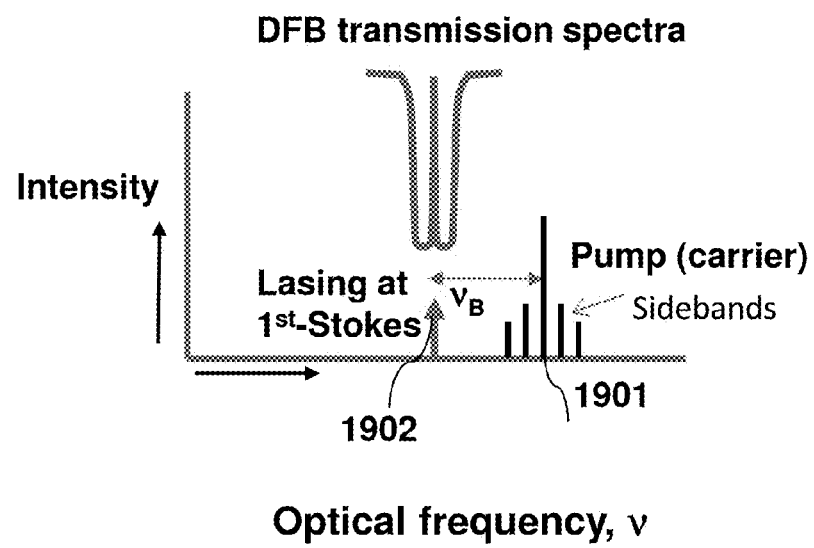
FIG. 19 illustrates a DFB Brillouin fiber laser transmission spectrum.

One way to achieve this using the DFB Brillouin laser is shown in FIGS. 18 and 19. FIG. 18 shows a schematic diagram of the laser with carrier and sideband spectrum 1802 and carrier suppressed spectrum 1801. FIG. 19 illustrates a spectrum of the optical signal (pump) and sidebands in 1901 and the spectral component of the first Stokes signal in 1902 of the DFB fiber Bragg grating. The grating spectrum can be red-shifted or blue-shifted by controlling the temperature or longitudinal strain, to satisfy the lasing condition. Similarly, external perturbations, such as twisting or bending, can be used to modify the birefringent properties of the fiber, influencing the polarization properties of the signal output.

When a weakly modulated optical signal with sufficient intensity is incident on the FBG, the carrier can be converted to Stokes wave through Brillouin lasing, while the sidebands remain unaffected. The converted Stokes output can be made to propagate in the backward direction, by properly choosing the orientation of the phase-offset DFB FBG. The suppressed carrier optical wave can thus be obtained in the forward direction with very little loss.

(C) Temperature and Strain Sensing

Figure 8:
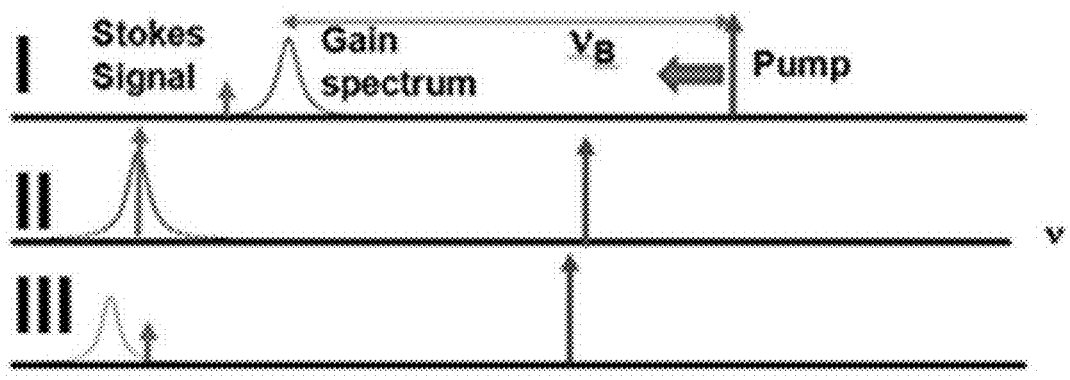
FIG. 8 illustrates the effect of pump laser detuning on a Stokes signal of the DFB Brillouin fiber laser.
Figure 20:
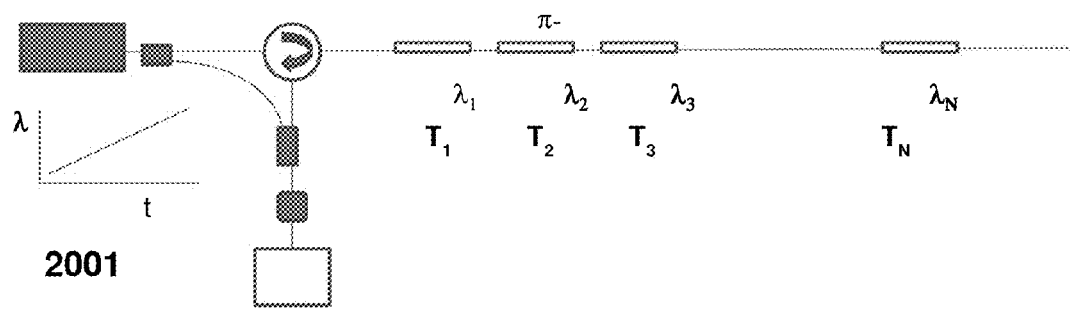
FIG. 20 illustrates a DFB Brillouin fiber laser.

Another application of the Brillouin DFB fiber laser is sensing of temperature or strain. A schematic diagram of such sensor capable of multipoint (distributed sensing) is shown in FIG. 20. This sensor has multiple π-shifted DFBs with slightly different resonance wavelength indicated by $\lambda_1$, $\lambda_2$, $\lambda_3$, ... $\lambda_n$. These are pumped by a common pump source, the wavelength of which is scanned from shorter to longer wavelengths. When the pump wavelength comes close to within approximately 10 GHz of the DFB cavity resonance frequency (since 10 GHz is the Stokes frequency shift of the fiber used in making grating of the DFB laser), it will start lasing at the Stokes wavelength. As shown in FIGS. 7, 8 and 9, the Brillouin lasing in DFBs can sustain lasing over a pump frequency variation of approximately 1 GHz, and so measuring the beat frequency between the pump and the Stokes output during the time the particular DFB laser is lasing will give the Stokes frequency shift, $v_B$. Moreover, because $v_B$ depends on temperature and strain, by monitoring the beat frequency it is possible to extract the temperature of the DFB that is lasing. To separate the cross-effects of temperature and strain, an additional unstrained DFB can be used. Note that a wide array of measurand fields can be sensed using such an arrangement if the gratings interact with an actuator that converts the measurand field to a strain field. For example, the apparatus of FIG. 20 can be used to sense pressure (or acoustics) if the grating housing is arranged to enable a change in pressure to induce a change in strain of the fiber grating.

Figure 21:
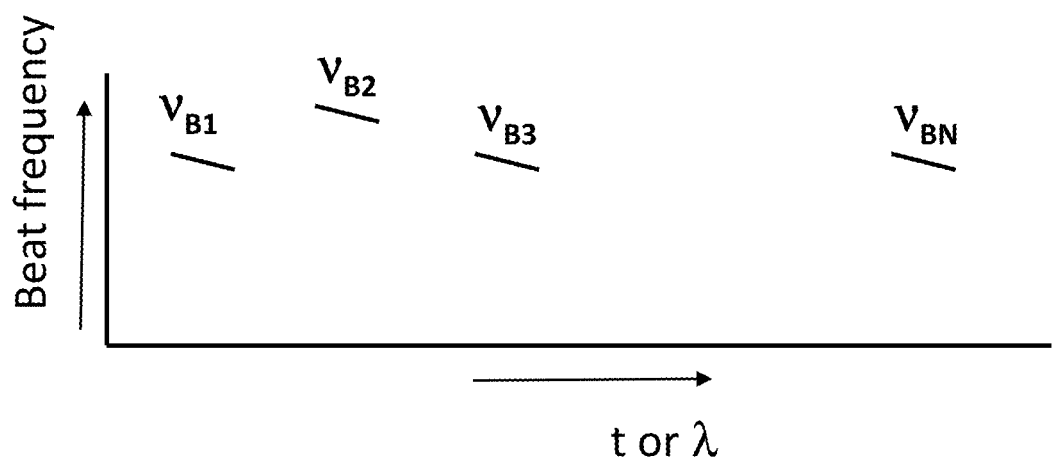
FIG. 21 illustrates a performance of multiple DFB Brillouin fiber lasers.

Tuning the wavelength linearly will cause each of the DFB lasers to operate one at a time, as illustrated in FIG. 21. Thus, by monitoring the beat frequencies at each location, the effect of temperature and strain at each location can be correlated with the lasing of the Brillouin DFB laser at that corresponding location.

In FIG. 18 the DFB laser sensor is interrogated from the source end. By reversing the orientation of the offset in the phase shift, the Stokes output can be obtained in the forward direction, which will make it possible to achieve interrogation from the front end, if needed.

ADVANTAGES

Brillouin DFB fiber laser sensors have a number of advantages:
1. High spatial resolution (about 15 cm) can be achieved. Currently distributed Brillouin scattering sensors have a resolution of 1 m. In one embodiment, a Brillouin fiber laser sensor is provided that has a spatial resolution of substantially less than 1 meter, preferably less than 50 cm, more preferably of less than 20 cm and most preferably of 15 cm or less.
2. Bragg wavelength separation being only about 2 nm, several tens of gratings can be placed in series and interrogated using a broadband tunable laser.
3. Unlike rare-earth DFB fiber lasers, which have a tendency to oscillate with two polarization modes, DFB Brillouin lasers oscillate predominately with one polarization. The birefringence in the DFB grating causes polarization splitting that is about 200 MHz, which is much larger than the Brillouin gain linewidth, thus making it possible to restrict lasing in only one polarization state.
4. Simple interrogation techniques can be employed, and can be done from either end or both.
5. Interrogation can be performed using heterodyning, allowing for higher sensitivity.
6. Sensors can be made in a single piece of fiber, which result in no splicing loss.

In summary, a Brillouin fiber laser is provided that uses a distributed feedback (DFB) fiber Bragg grating (FBG) as a resonator to allow reduction in length of the gain fiber or cavity. Such a device achieves lasing by using the stimulated Brillouin scattering (SBS) gain in the DFB when pumped by a narrow-linewidth laser. In particular, the DFB fiber Bragg grating has a discrete π-phase shift, which is offset from the physical center of the grating by a few percent of the grating length.

The DFB grating experiences stimulated Brillouin gain when pumped by a narrow-linewidth laser having an optical frequency that is higher than the central pass band of the grating by an amount nominally equal to the Stokes frequency shift, $v_B$. The lasing occurs at a wavelength that corresponds to the first Stokes wave. This implies that the pump and laser output are separated by the Stokes frequency shift, $v_B$, which is typically less than 20 GHz in silica or other optical material.

The disclosed DFB Brillouin fiber laser has a number of notable advantages compared with existing lasers. For example, low threshold is achieved by utilizing a DFB fiber Bragg grating with π-phase shift as a resonator that is pumped with the narrow-linewidth laser to induce stimulated Brillouin scattering. Also, the DFB Brillouin fiber laser allows efficient pumping of single frequency laser radiation into the cavity without using any fiber-optic couplers. This ensures low intra-cavity loss, and higher efficiency.

Additionally, the DFB fiber laser does not rely on population inversion of rare earth ions, but on the stimulated Brillouin scattering (SBS) induced by a narrow linewidth pump. The DFB fiber laser is not doped with a rare earth element and, as a consequence, the output wavelength is dictated by the grating and not by the energy levels of the gain medium. Thus, the laser is spectrally more transparent. This makes it possible to connect several DFB lasers in series, and to allow pumping using a multi-wavelength or wavelength tunable laser source. Thus, in one embodiment, several DFB lasers are connected series, and are pumped by a multi-wavelength or wavelength tunable narrow-linewidth laser source that induces stimulated Brillouin scattering.

The DFB Brillouin fiber laser oscillates in one polarization state, which eliminates any instability owing to polarization switching. By making the DFB grating from birefringent fiber, the wavelength splitting of the two polarization modes can be made to be significantly larger than the Brillouin gain linewidth, and thus ensures lasing in one polarization state. Thus, in one embodiment, the grating in the DFB fiber laser that is pumped with the narrow-linewidth laser to induce stimulated Brillouin scattering is made from birefringent fiber.

The coupling coefficient and the length of the π-phase-shifted DFB FBG are chosen so that, the reflection band is narrower than twice the Stokes frequency shift (i.e. $2\Delta v_B$). This allows the pump laser to transmit through the FBG and introduce Brillouin gain.

The propagation direction of the Stokes wave in Brillouin fiber ring lasers is opposite to the direction of pump propagation. The DFB Brillouin laser can be operated with Stokes output emitted in either direction, forward or backward, and also in both directions. The laser output can be delivered either along the direction of the pump propagation (by choosing the direction of the discrete phase-offset to be in the direction of pump), or in the reverse direction (by choosing the direction of the discrete phase offset to be in a direction that is opposite to the pump propagation direction). This makes it possible to use this DFB laser as an inline optical device, by directly splicing it to the delivery fiber of the pump source and obtain the Stokes output in the forward direction.

The DFB Brillouin fiber laser is more tolerant against pump frequency variations, due to the Kerr nonlinear effect and a non-uniform temperature distribution inside the cavity. Lasing in the DFB laser can be maintained, when the pump frequency is detuned by more than one GHz, which is over 50 times larger than the Brillouin gain bandwidth, $v_B$. In a conventional doubly resonant Brillouin fiber laser, the pump frequency can be detuned by only approximately $v_B$ before it stops lasing. This can save the use of at least one stringent feedback locking circuitry.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A fiber laser, comprising:
   a distributed feedback cavity with a grating, the grating having a resonance frequency ($v_o$); and
   a pump source optically coupled to one end of the cavity, the pump source to launch pump radiation, the pump radiation having a peak frequency ($v_p$), the pump radiation producing a stimulated Brillouin gain characterized by a Stokes frequency shift ($v_B$) inside the cavity, the stimulated Brillouin gain producing lasing at a Stokes wavelength, the distributed feedback cavity having a reflection band, the reflection band having a half-width that is smaller than $v_B$, $v_p$ being higher than $v_o$ by an amount nominally equal to $v_B$.

2. The fiber laser of claim 1 having the magnitude of the quantity, $v_p$-$v_B$-$v_o$ being less than approximately ten times the Brillouin line width.

3. The fiber laser of claim 1, the distributed feedback cavity having a reflection band, the reflection band having a half-width that is smaller than $v_B$.

4. The fiber laser of claim 1, the distributed feedback cavity having a phase shift, the phase shift being approximately $\pi$ radian.

5. The fiber laser of claim 1, further comprising a fiber Bragg grating (FBG).

6. The fiber laser of claim 5, the FBG being apodized.

7. The fiber laser of claim 5, comprising a birefringent fiber.

8. The fiber laser of claim 1, further comprising:
   a detector to detect an intensity of a Stokes output;
   a comparator to compare the detected Stokes output with a reference, the comparison resulting in an error signal; and
   a feedback loop to stabilize an output level of the fiber laser using the error signal.

9. The fiber laser of claim 1, further comprising:
   means for detecting an intensity of a Stokes output;
   means for comparing a detected residual pump with a reference, the comparison resulting in an error signal; and
   means for stabilizing an output level of the fiber laser using the error signal.

10. A system, comprising:
    a pump source to launch pump radiation, the pump radiation having a peak ($v_p$), the pump radiation producing a stimulated Brillouin gain, the stimulated Brillouin gain producing lasing at a Stokes wavelength;
    a first feedback cavity in series with the pump source, the first feedback cavity having a Stokes frequency shift ($v_{B1}$); and
    a second feedback cavity in series with the first feedback cavity, the second feedback cavity being pumped by the pump source, the second feedback cavity having a Stokes frequency shift ($v_{B2}$).

11. The system of claim 10, further comprising:
    a third feedback cavity in series with the second feedback cavity, the third feedback cavity having a Stokes frequency shift ($v_{B3}$).

* * * * *